Dec. 11, 1928.

G. J. TEIGLAND 1,695,216

MARINE GOVERNOR FOR SEAGOING SHIPS

Filed Jan. 25, 1927   3 Sheets-Sheet 1

INVENTOR
George Johnson Teigland

Dec. 11, 1928.　　　　　　　　　　　　　　　　　　　　　　1,695,216
G. J. TEIGLAND
MARINE GOVERNOR FOR SEAGOING SHIPS
Filed Jan. 25, 1927　　　3 Sheets-Sheet 2

INVENTOR
George Johnson Teigland

Dec. 11, 1928.
G. J. TEIGLAND
1,695,216
MARINE GOVERNOR FOR SEAGOING SHIPS
Filed Jan. 25, 1927    3 Sheets-Sheet 3
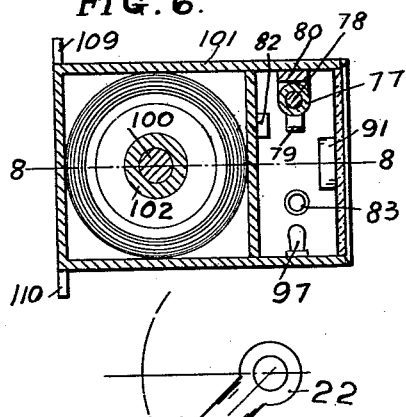
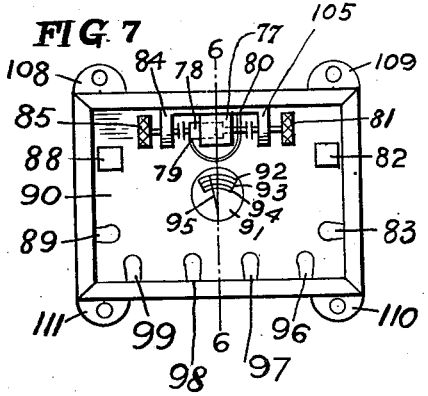
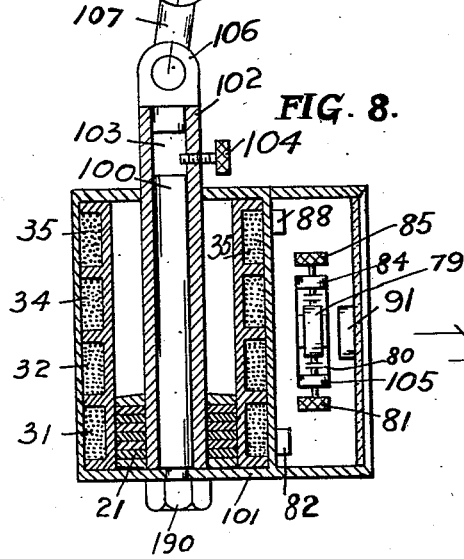
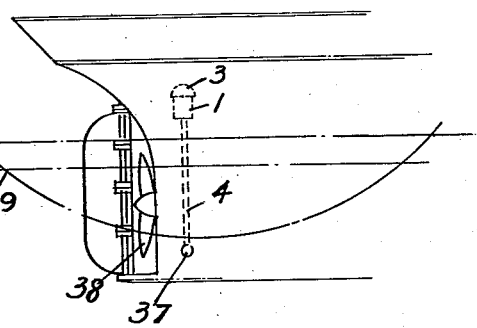
INVENTOR
George Johnson Teigland Patented Dec. 11, 1928.

1,695,216

UNITED STATES PATENT OFFICE.

GEORGE JOHNSON TEIGLAND, OF HADDONFIELD, NEW JERSEY.

MARINE GOVERNOR FOR SEAGOING SHIPS.

Application filed January 25, 1927. Serial No. 163,412.

The present invention relates to an improved marine governor for ships on high seas, and wherein a relatively new construction is involved.

Due to the ship on high seas rising and dipping creating variable water pressure around the propeller which submerges at times below normal water line and again emerges way above normal, the marine engine races, and it is the purpose of this invention to utilize the variation in water pressure around the propeller to operate the governor.

The variation in water pressure is applied to this governor through a pipe leading from the outside of the ship near the propeller, while the governor is located above the water line.

The variation in water pressure operates a piston inside a cylinder balancing between a constant vacuum over the piston, and a variation in vacuum relative to the variation in water pressure under the piston which operates a piston rod, which when moving up or down will make and break an electric circuit to a series of magnetic solenoid coils. This magnetic solenoid coil operates a throttle lever (which in turn operatively connects with the source operating the propeller shaft) according to the pressure of water in the vicinity of the propeller. It is an aim to employ a light in circuit with each magnetic coil to show the operation of this governor. The emergency part of the governor has a red light and a bell in the circuit for signaling and warning, and are designed to operate by the increase of speed of one or more revolutions above normal speed of the marine engine. Also a buzzer and a blue light operate to give signal for low speed limit. An anticipating part of the governor will operate between these two limits and the adjustment of the same may be made so that red and blue lights will not be visible.

Another purpose is to provide, in a governor of this kind a main cylinder and an auxiliary cylinder in the main cylinder including a piston, the construction and arrangement of such parts being such as to provide and insure a vacuum on both sides of the piston, the piston balancing between the two vacuums.

Still another purpose is to provide a marine governor, wherein the chamber above the piston has requisite quantity of oil above the piston and said oil acting to seal the structural parts as well as lubricating them and increasing or decreasing space left for the vacuum.

A further purpose is to relieve a water collection around the piston and to insure a cushion above the water and preventing water from reaching the piston.

A still further purpose is to provide in a governor of this kind, means to permit escaping of air prior to the rise of the water.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 6 is a vertical sectional view of a series of magnetic coils, signal panel arrangement on line 6—6 of Figure 7.

Figure 7 is a vertical view of the structure in Figure 6 showing the signal lights, the bell buzzer and other instruments.

Figure 8 is a vertical sectional view of a series of magnetic coils and signal panel on line 8—8 of Figure 6.

Figure 9 is a side view of the stern of a ship, showing the position of the governor and its pipe, the latter being in dotted lines.

Figures 1, 2:
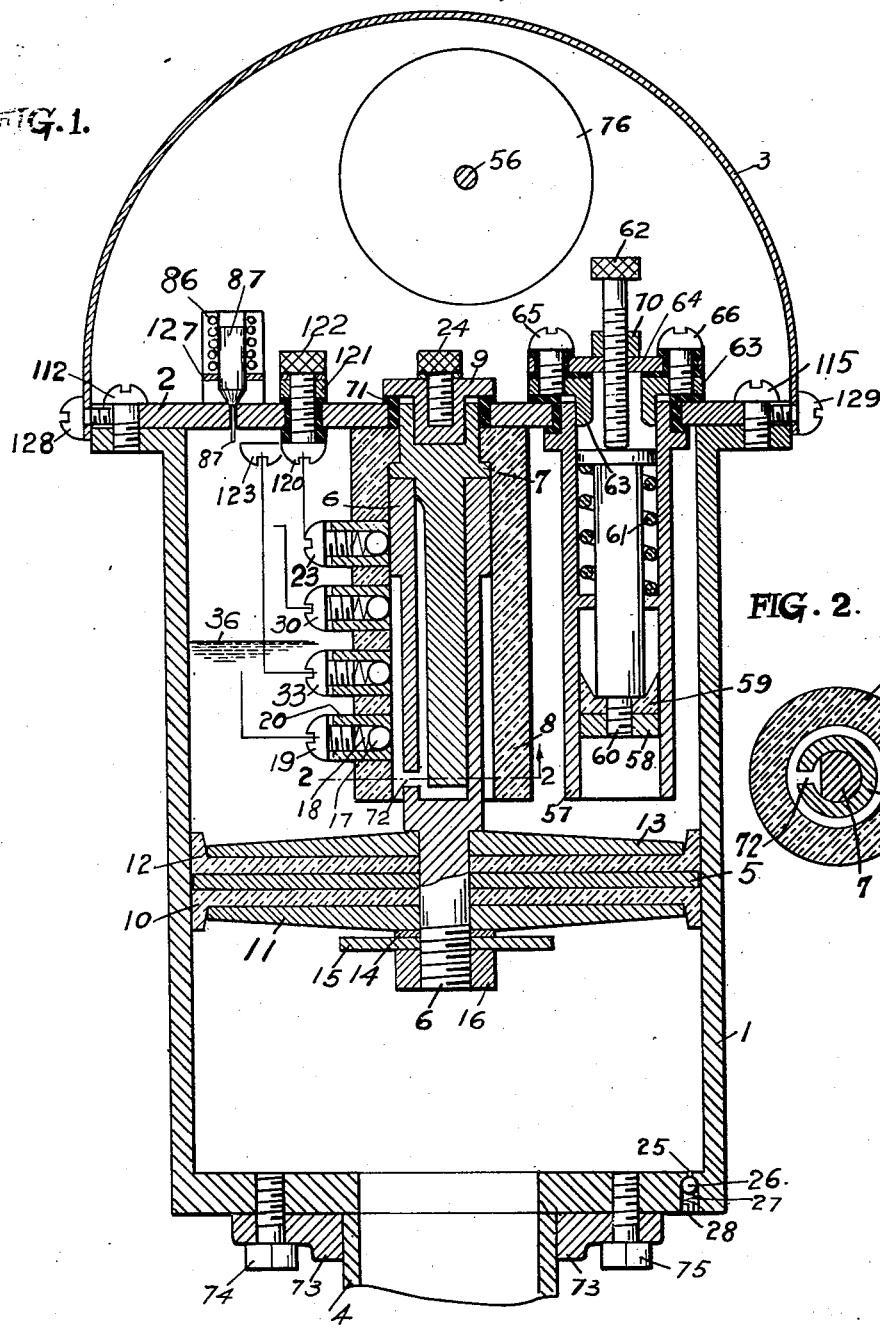
Figure 1 is a vertical sectional view in detail of the governor on line 1—1 of Figure 3.
Figure 2 is a sectional view of the piston rod and guide on line 2—2 of Figure 1.

Referring to the drawings, 1 identifies the main cylinder which is provided with a cover 2 fastened in place by screws 112, 113, 114, 115, 116 and 117. A pipe 4 connects with the bottom of the cylinder at a point above the water pressure and terminates through the bottom of the ship's hull below the propeller.

Operable in the main cylinder is a dominate piston 5 including a piston rod 6 which has a central bore from the top to a point approximating the upper face of the piston, said bore to receive a guide rod 7 which has a collar with which a sleeve 8 engages. The upper end of the sleeve has an inturned shoulder resting upon the collar 7, the cover 2 being clamped against the upper end of the sleeve by means of a nut 9, which serves to secure the sleeve 8, which carries a plurality of terminals 23, 30, 33 and 19, all of which are included in an electric circuit, the piston rod constituting a member of said circuit.

The piston 5 includes a central plate with rubber packing 10 above and below for making air tight construction, due to plates 11 and 13 retaining the packing 10 and 12 clamped in place, the plate 13 engaging a shoulder on the piston rod with a washer 14 engaging the plate 11, and a nut 16 for not only holding a resilient bumper 15 against the washer, but also acting to bind the piston structure against the shoulder.

Carried by the sleeve 8 is a plurality of thimbles fastened in the sleeve in any approved manner and in a vertical row, and in which are mounted the terminal screws 19, 33, 30 and 23, said thimbles being identified by the numeral 20. Also mounted within the thimbles are contact balls or spherical members 17 with springs 18 bearing between the contact screws and the balls or spherical members, to hold the latter in constant contact with the cylindrical surface of the piston rod as the piston rod varies in its movement through the sleeve and over the guide rod 7. In this way the piston rod through the medium of the balls, is at all times in the circuit, which will act to transmit movement of the piston to the magnetic solenoid core 21, and this action moves the throttle lever 22 in steps, in unison with the piston. With the electric circuit closed as shown in Figure 1 screw terminal 23 is in circuit with the piston rod 6, the guide rod 7 and the nut 9 to a terminal 24 (attention being directed to the schematic wiring diagram, Figure 3) with the ship, as in Figure 9, on a high rolling wave with water rising over the cylinder 1, air will escape through a check valve in the bottom of the cylinder 1. This check valve comprises a ball 26 held in place by a spring 27 and a plug 28. With the water rising around the cylinder 1 it will naturally enter the pipe 4 which connects with the main cylinder above the water pressure near the bottom part of the propeller, until the check valve is covered with water, which prevents escape of air and stops the water at such level.

As the waves are rolling and the ship is moving water gradually reaches a level at 29 in Figure 9, when gravity of the water in the pipe 4 will create a vacuum to overbalance vacuum above the piston 5, which will cause the latter to follow the increasing weight of water in the pipe 4 due to the decrease of pressure outside of the ship. By the piston moving downward from its first position shown in Figure 1 the circuits are made and broken as follows.

For example terminals 23 and 30 will be in circuit with coils 31 and 32 (Figure 8), with the magnetic core 21 between the coils 31 and 32. Then the circuit may be broken with 23 but still in circuit with 30 and 32 only, the magnetic core 21 will bring itself in position in circuit with magnetic coil 32, 33 and 30 in circuit with coils 32 and 34 placing magnetic core 21 between 32 and 34. Terminal 33 and coil 34 may then be in circuit, the magnetic door 21 in position adjacent the coil 34. The terminals 19 and 33 being in circuit with coils 34 and 35, the magnetic core 21 being between 34 and 35. Then again the terminal 19 with coil 35 and the magnetic core 21 positioned adjacent the coil 35. These series of circuits complete one downward movement from the position shown in Figure 1, to a position where the bumper may come in contact with the bottom of main cylinder 1. On a return stroke of the piston the several circuits as previously stated will make and break in the same order, starting at the bottom as the water rises, caused by another wave.

The oil level is identified in the cylinder at 26 first to seal the piston against leakage; second to lubricate the piston and third to regulate the vacuum so that the piston will move a fixed distance to cooperate with any diameter of propeller, and by the adjustment of a screw 62 the vacuum above the piston may be fixed so that the piston 5 may start on a downward movement with a fixed portion of the propeller emerged and a space regulated with oil, so that the piston 5 will reach the bottom when the outside water line is at the lower end of the pipe 4 identified at 37.

Figure 3:
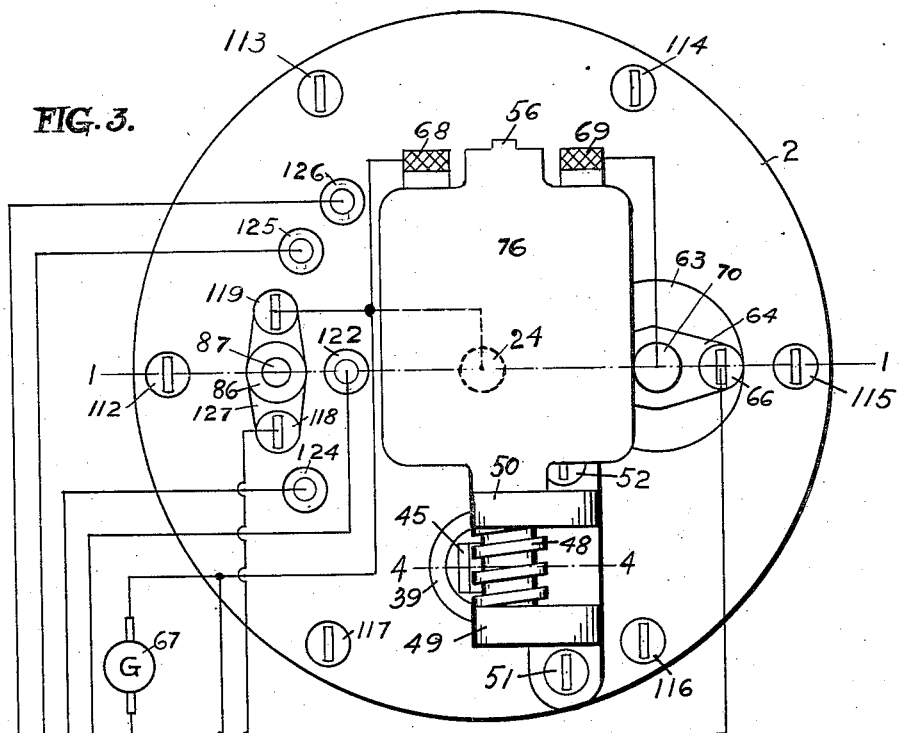
Figure 3 is a plan view of the governor with the bonnet removed showing the diagrammatic wiring.
Figure 4:
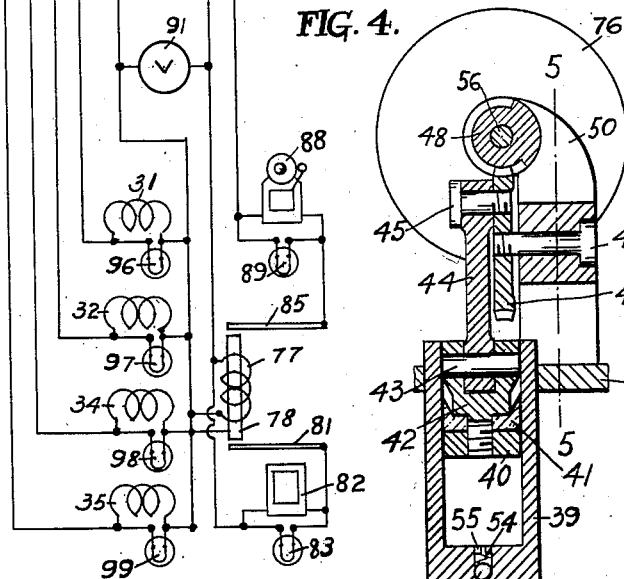
Figure 4 is a vertical sectional view of a vacuum pump on line 4—4 of Figure 3.
Figure 5:
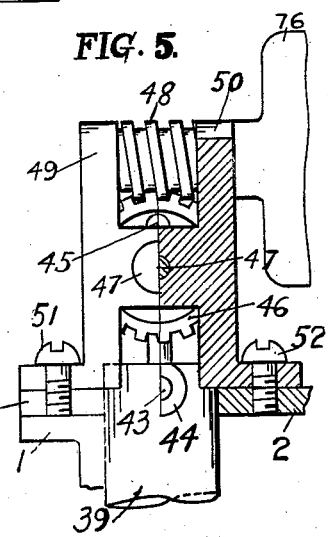
Figure 5 is a vertical sectional view on the center line of the supporting bracket showing the worm gear for the vacuum pump on line 5—5 of Figure 4.

To maintain a fixed vacuum over the oil level, a pump as in Figure 4 (which is a vertical sectional view on line 4—4 of Figure 3) is provided. This pump includes a cylinder 39 with a piston 42 mounted therein, said piston being provided with a packing 41 (which also acts as a check valve) of any suitable material preferably rubber. The packing 41 is held in place by means of a nut 40. A pin 43 connects the piston to a connecting rod 44, which in turn is pivotally mounted upon a pin 45 carried excentrically on a worm gear 46 which rotates with a pin 47 and meshes with a worm 48. A shaft 56 of a motor 76 is mounted in bearings 49 and 50 and carries the worm 48 between the bearings, which are fastened to the cover 2 by means of screws 51 and 52 as shown clearly in Figures 3 and 5. In the bottom of the cylinder 39 a ball check valve is located held in operative position by means of a spring 54 and a plug 55. The worm 48 operated by the motor shaft 56 automatically regulates a fixed vacuum in the cylinder 1 through the medium of the control cylinder 57 and the piston 58 operable in the cylinder 57. The piston 58 includes a packing 59, preferably of rubber, held in place on the end of the piston rod 60 through the medium of the piston 58.

The piston rod 60 is under tension through the medium of a spring 61 interposed between a head of the rod 60 and a shoulder on the interior of the cylinder 57, the spring 61 acts to permit the piston 58 to follow slightly the downward movement of the piston 5 but will always return the piston 58 to its initial position on the return of the piston 5 unless a leak of the vacuum occurs, and when the piston 58 ascends and contacts with the adjusting screw 62, it will close a circuit with the motor 76 and replace vacuum in the cylinder 1, the spring 61 becoming compressed, and hence opening a circuit between the piston rod 60 and the adjusting screw 62, which will stop the motor 76. This operation automatically repeats as required, according to the water pressure in the vicinity of the propeller. The cylinder 57 is held in place by means of a collar 63 and a supporting bar 64, which are secured in place by screws 65 and 66. The screw 66 acts as a terminal for a wire (over which current flows) from the generator 67 to the motor terminal 68, through the motor 76 and from the other motor terminal 69, current being conducted to the lock nut 70, with vacuum in the cylinder 1 so that a circuit is closed including the piston rod 60, the cylinder 57, the collar 63 and to the terminal 66 and the generator 67.

Insulation 71 is interposed between the cover 2 and any parts such as the collar 63 and the lock nut 121.

An opening or aperture 72 is formed in the wall of the piston rod 6, as shown in Figures 1 and 2, the latter being on line 2—2 of Figure 1. This aperture is for the purpose of permitting the oil above the piston 5 to enter the interior of the piston rod 6 and around the piston rod for lubricating purposes as well as lubricating the guide rod 7 and its flat portion. The flat portion of the guide 7 closes before the piston rod 6 reaches the limit of its upward movement and retains a requisite amount of oil as a cushion.

The stand pipe 4 has a flange 73 secured to the cylinder 1 by means of bolts 74 and 75.

Referring to the wiring diagram in Figure 3 a high resistance coil 77 is provided, being at all times in circuit with the generator 67 and is designed for operating the magnetic core 78.

A spring 79 is fastened on one end of the magnetic core 78, and its other end is fastened to a base 80 which has two lateral ends 84 and 105, the latter carrying an adjusting thumb screw 81 and the former carrying a similar screw 85. The adjusting thumb screw 81 is in circuit with a buzzer 82 and a blue light 83, as a signal for low speed though the adjusting thumb screw 81 may be set for any desired speed. As the speed increases over the regulated speed the circuit is again broken. The adjusting screw 85, when excess speed is created, is in circuit with an emergency coil 86 operating a needle valve 87 to admit air into the cylinder 1, which operates a throttle valve regardless of pressure in the vicinity of the propeller 38. This circuit includes a bell 88 and a red light 89, and is broken when speed of main engine drops below the fixed limit, according to the setting of the adjusting thumb screw 85.

At this time the motor 76 is active in renewing vacuum supply in the cylinder 1, and this vacuum is predetermined or fixed due to the adjusting screw 62. In other words the adjusting screw 62 may be set, for determining the amount of vacuum in the cylinder 1.

A glass panel 90 covers a meter 91 which shows the speed at 92, the revolutions of the engine at 93, and the voltage of the generator 67.

The graduations at 92, 93 and 94 may be made to suit the character of needle 95 there being lights 96, 97, 98 and 99 in circuit with the coils 31 and 32, and 34 and 35 respectively, and will light in the same order as the circuits are closed.

A bolt 100 is fastened with a nut 190 to a casing 101. Enclosed in this casing is the entire diagram wiring shown in Figure 3. A tube 102 surrounds the bolt 100 and extends through the casing 101 and telescopes the bolt 100 which acts as a guide, and the lower end of the tube 102 carries the magnetic solenoid core 21.

A yoke 106 is connected in any approved manner to the tube 102 and is in turn connected with one end of a link 107, the other end of which connects with a throttle lever 22 which regulates the steam or any other power that may drive the propeller.

The tube 102 is of such length that when its core 21 is at its lower limit an air pocket 103 is created between where the yoke 106 connects with the tube 102 and to permit air to slowly enter and expel into and from the tube 102, a valve 104 is provided. Furthermore the air pocket constitutes a cushion for the magnetic solenoid core 21.

The casing 101 is provided with lugs 108, 109, 110 and 111 more clearly shown in Figure 7, and by means of screws 118 and 119 the emergency coil 86 is fastened to the cover 2, and said screws act as terminals to the coil 86.

The terminal 23 is in circuit with and wired to the screw 120, a lock nut 121 and terminal nut 122. Terminal 30 is in circuit with the terminal nut 124, Figure 3, or carried by the cover 2. The terminal 33 connects with the screw 123 beneath the cover 2 and with the terminal nut 125 on the top surface of the cover as in Figure 3. Terminal 19 is in circuit with the nut 126, thus completing the four circuits to the governor.

Screws 128 and 129 are employed for fastening a bonnet 3 to the cover 2, not in an air tight manner, but simply employed to present a neat appearance to the governor and to protect the entire mechanism located on the governor. A D. C. generator 67, may be driven by the main engine making about ten revolutions to one revolution of the main engine, to cause the emergency governor and instrument reading sensitive. The anticipating governor without an emergency control may not require a generator 67 as a battery or any other approved supply means will operate such anticipating governor.

It is understood that prior to this invention that anticipating and emergency marine governors have been devised responsive to the pitching movement of a ship, hence the differences between the present governor and those heretofore used, are hereby explained by giving two positions of a ship and the following results.

The first position is when the stern of the ship is lifted on a high wave, in which case the water is above the normal, consequently pressure in the vicinity of the propeller is higher than normal and the governor operated by the pitching movement will shut off steam in this position; while the anticipating governor working by variation of pressure in the vicinity of the propeller, will not shut off the steam when the stern of the ship is lifted high on a wave with the water line above normal.

The second position is when a wave rocking extremely high causing the water line to be way above normal at mid-ship, thus causing the water line at the bow and stern to be below normal, giving a decrease of the pressure of water in the vicinity of a propeller, which will operate the present governor, which works by variation of water pressure, but will not operate governor, which works by pitching movement of the ship. Engine will therefore race, with the ship in this position and will greatly slow up with the ship in first position; but a governor operated by variation of pressure around the propeller will keep full steam pressure on the engine in the first position of the ship and reduce same in relation of reduced pressure of water in the vicinity of the propeller for the second position. The first and second positions fully explain and show the main differences which constitute the essential features of this invention.

The invention having been set forth what is claimed is:

1. In an anticipating emergency marine governor, a main cylinder, a piston operable therein, a cylinder pump in the main cylinder above the piston, a third cylinder within the main cylinder above the piston, a piston rod operable in the third cylinder and connected to the piston, vacuum means for controlling said piston rod and its piston and electric circuits having electro-mechanical connections with the pump, whereby the making and breaking of the electric circuits may constitute means operatively associated with the vacuum means to maintain a constant vacuum in the main cylinder.

2. In an anticipating emergency marine governor, a main cylinder with a stand pipe terminating adjacent to the propeller of a ship to receive variable water pressure in vicinity of the propeller, a piston in the cylinder and operatively balanced between vacuums above and below the piston, a cylinder pump mounted in the main cylinder above the piston, a third cylinder in the main cylinder above the piston, a plurality of circuits having electromechanical means operatively associating the elements of the second and third cylinders, and means operatively associated with the piston and being vacuum controlled in the third cylinder for opening and closing said circuits, maintaining a constant vacuum in the main cylinder by operating the cylinder pump.

3. A marine governor responsive to the variation of water pressure in the vicinity of a propeller of a ship, comprising a main cylinder, a piston balanced between vacuums above and below the piston, a cylinder pump above the piston, a third cylinder above the piston, a plurality of circuits having electromechanical means operatively associating the elements of the second and third cylinders, and a member operatively associated with the piston and being vacuum controlled in the third cylinder for opening and closing the circuits by operating the pump for maintaining a constant vacuum in the main cylinder.

4. A marine governor responsive to the variation of water pressure in the vicinity of a propeller of a ship, comprising a main cylinder, a piston balanced between vacuums above and below the piston, a cylinder pump above the piston, a third cylinder above the piston, a plurality of circuits having electromechanical means operatively associating the elements of the second and third cylinders, and a member operatively associating with the piston and being vacuum controlled in the third cylinder for opening and closing the circuits by operating the pump for maintaining a constant vacuum in the main cylinder, the main cylinder adapted to contain a body of oil above the piston for sealing and lubricating the piston and its member and to regulate the space for the vacuum above the piston, whereby the piston may move a requisite distance.

5. A marine governor responsive to the variation of water pressure in the vicinity of a propeller of a ship, comprising a main cylinder, a piston balanced between vacuums above and below the piston, a cylinder pump above the piston, a third cylinder above the piston, a plurality of circuits having electromechanical means operatively associating elements of the second and third cylinders, a member operatively associated with the piston and being vacuum controlled in the third cylinder for opening and closing the circuits by operating the pump for maintaining a constant vacuum in the main cylinder, the main cylinder adapted to contain a body of oil above the piston for sealing and lubricating the piston and to regulate the space for the vacuum above the piston whereby the piston may move a requisite distance, and means adjustable, so that a downward movement of the piston will start with a portion of the ship's propeller emerged.

6. In a marine governor responsive to the variable water pressure in the vicinity of a ship's propeller, the combination with a main cylinder, of a piston therein balanced between vacuums above and below and means electrically controlled and within the main cylinder above the piston for maintaining a constant vacuum in the main cylinder above the piston.

7. In a marine governor responsive to the variable water pressure in the vicinity of a ship's propeller, the combination with a main cylinder, of a piston therein balanced between vacuums above and below and means electrically controlled and within the main cylinder above the piston for maintaining a constant vacuum in the main cylinder above the piston, said cylinder having a body of oil above the piston to seal and lubricate the piston and to regulate a space for the vacuum and cause the piston to move a requisite fixed distance.

8. In a marine governor responsive to the variable water pressure in the vicinity of a ship's propeller, the combination with a main cylinder, of a piston therein balanced between vacuums above and below and means electrically controlled and within the main cylinder above the piston for maintaining a constant vacuum in the main cylinder above the piston, said cylinder having a body of oil above the piston to seal and lubricate the piston and to regulate a space for the vacuum and cause the piston to move a requisite fixed distance, and an element adjustably associated with said electrical controlled means for predetermining the vacuum above the piston.

9. In a marine governor responsive to the variable water pressure in the vicinity of a ship's propeller, the combination with a main cylinder, of a piston therein balanced between vacuums above and below the piston, means above the piston in the main cylinder electrically controlled and having a plurality of circuits for maintaining a constant vacuum in the main cylinder above the piston, a cylinder and a piston rod and its piston operatively associated with said electrically controlled means and being responsive to the action of the piston for variably and intermittently opening and closing the circuits.

10. In a marine governor responsive to the variable water pressure in the vicinity of a ship's propeller, the combination with a main cylinder, of a piston therein balanced between vacuums above and below the piston, means above the piston in the main cylinder electrically controlled and having a plurality of circuits for maintaining a constant vacuum in the main cylinder above the piston, a cylinder and a piston rod with a piston operatively associated with said electrically controlled means and being responsive to the action of the piston for variably and intermittently opening and closing the circuits, said main cylinder containing a body of oil for sealing and lubricating the piston and its piston rod and to regulate a space for the vacuum above the piston causing the piston to move a requisite fixed distance.

11. In a marine governor responsive to the variable water pressure in the vicinity of a ship's propeller, the combination with a main cylinder, of a piston therein balanced between vacuums above and below the piston, means above the piston in the main cylinder electrically controlled and having a plurality of circuits for maintaining a constant vacuum in the main cylinder above the piston, a cylinder and a piston rod with a piston operatively associated with said electrically controlled means and being responsive to the action of the piston for variably and intermittently opening and closing the circuits, a pump operatively associated with the electrically controlled means and having an element adjustably associated with the pump for predetermining the vacuum above the piston, a guide for the piston rod, said piston rod being tubular and the guide being partly cut away, said piston rod having a passage connecting the interior of the rod with the interior of the cylinder in which the rod is mounted, said main cylinder having a body of oil above the piston for sealing and lubricating the piston and the piston rod and regulating the space for the vacuum above the piston causing the piston to move a requisite fixed distance.

In testimony whereof he affixes his signature.

GEORGE J. TEIGLAND.